Jan. 13, 1931.  E. E. NELDNER  1,789,080
VALVE SEAT FINISHING TOOL
Filed July 30, 1927
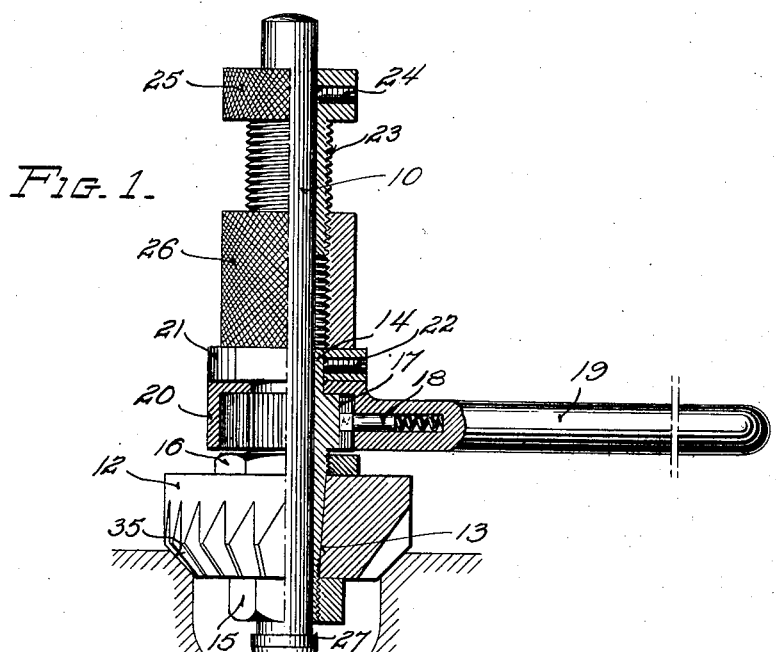
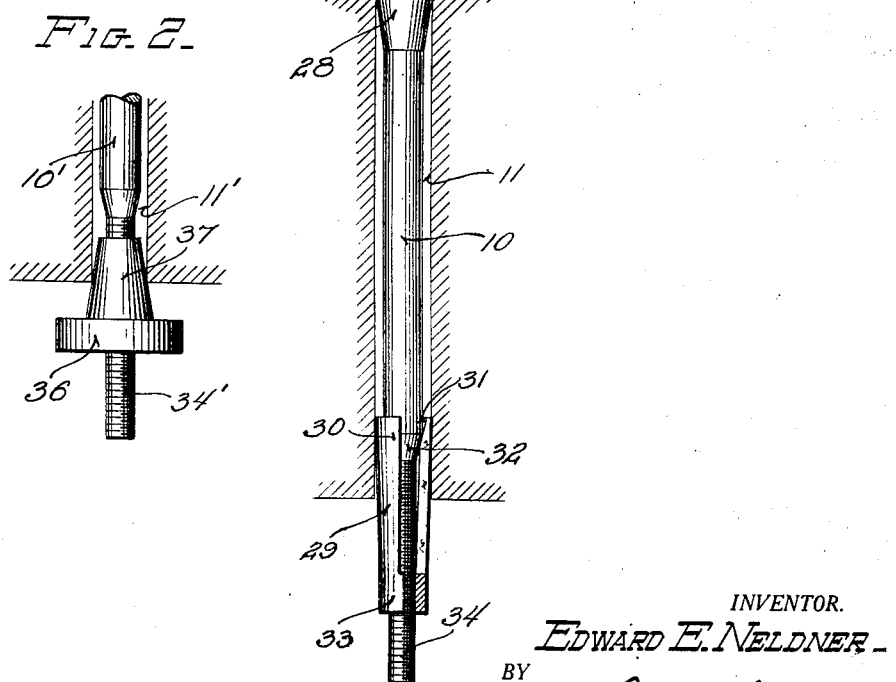
INVENTOR.
EDWARD E. NELDNER
BY
ATTORNEY.

UNITED STATES PATENT OFFICE

EDWARD E. NELDNER, OF MILWAUKEE, WISCONSIN

VALVE-SEAT-FINISHING TOOL

Application filed July 30, 1927. Serial No. 209,416. REISSUED

This invention relates to tools for finishing the seats of poppet valves.

One object of the present invention is the provision of a tool of simple and economical design capable of finishing or refinishing poppet valve seats with utmost accuracy.

Another object is the provision of a tool for the purposes named which may be expeditiously applied, accurately centered, and firmly anchored in the work with a minimum effort on the part of the operator.

Another object is the provision of new and improved centering means for a tool of the character mentioned.

Other objects and advantages will appear from the following description of an illustrative embodiment of the present invention.

In the drawings:—

Figure 1 is a view half in section and half in elevation of a tool constructed in accordance with the present invention, illustrating the mode of applying the same to a valve seat of conventional form.

Fig. 2 is a view in elevation of a modified form of tool centering means.

The tool selected for illustration comprises a guide spindle 10 designed for insertion within the usual valve-stem guide 11 and constituting a support and guide for a milling cutter 12, of a well known type. The cutter shown is of a type commonly used in the refinishing of valve seats. In this instance the cutter 12 is firmly anchored upon the tapered end 13 of a sleeve 14 of moderate length, closely fitted for rotation and lengthwise travel upon the spindle 10. Appropriate means such as a nut 15 on the sleeve 14 retains the cutter in proper position thereon. A jam nut 16, threaded on the sleeve 14 immediately above the cutter 12, serves as a convenient means for forcing the cutter from its normally tight fit upon the tapered end 13 thus facilitates removal of the cutter when occasion arises.

The sleeve 14 also carries a ratchet wheel 17, which in this instance is formed integral therewith, and which coacts with a spring loaded pawl 18 in an appropriate handle 19 to effect rotation of the sleeve 14 and cutter 12 upon the spindle. The handle shown projects from a head 20 rotatably mounted upon the sleeve 14 and confined beneath a collar 21 removably fixed to the upper end of the sleeve by suitable means such as a set screw 22. The sleeve 14, carrying the cutter 12 and handle 19, is thus free to rotate upon and travel along the spindle 10, and the relatively long bearing surface between the sleeve and spindle insures absolute coincidence between the axes of the cutter and spindle.

Provision is also made in the tool shown for imparting a positive feed motion to the cutter along the spindle toward the work. This is accomplished in this instance by the use of a screw 23 mounted upon the upper portion of the spindle 10 and adjustably fixed thereto by a set screw 24. The screw shown is provided with a head 25 by which the spindle may be conveniently rotated for a purpose which will hereinafter appear. An elongated feed nut 26, threaded upon the screw 24, is disposed to bear at its lower end upon the collar 21, so as to force the collar 21, sleeve 14, and cutter 12 downwardly along the spindle 10 when the nut is rotated in one direction upon the screw 25. When rotated in the other direction the nut recedes from the collar 21 thereby permitting an elevation of the sleeve and cutter along the spindle.

In the tool shown the spindle is provided with a pair of longitudinally spaced centering elements designed to coact with the valve-stem guide 11 to effect and maintain coincidence of the axes of the guide and spindle, and to securely clamp the spindle to the work. One of the elements shown is in the form of a cone shaped member 27 disposed coaxially of and upon the spindle and having a tapered end 28 adapted to seat within the upper end of the guide 11. In this instance the member 27 is formed as an integral part of the spindle. The other element shown is in the form of a sleeve 29 disposed coaxially of the spindle and slitted for a portion of its length so that one end 30 thereof is expansible. The wall of the expansible end 30 is internally tapered, as at 31, for coaction with a similarly tapered shoulder 32 on the spindle. The other or solid end 33 of the sleeve is threaded upon the end 34 of the spindle. The diameter of the sleeve 29 is somewhat less than that of the guide 11 so that it may be passed freely, with the spindle, into the guide. The arrangement is such that relative rotation between the spindle and sleeve in such direction as to force the tapered end 31 thereof against the shoulder 32 will result in spreading the expansible end 30 of the sleeve against the internal wall of the guide and thus accurately center and firmly anchor the spindle therein.

The tool is ordinarily applied and operated as follows. Assuming that the nut 26 is retracted so as to permit free travel of the cutter 12 along the spindle 10, the lower end of the spindle, carrying the sleeve 29, is lowered into the valve-stem guide 11 until the tapered end 28 of the member 27 is firmly seated in the upper open end of the guide 11. Before entering the sleeve 29 into the guide, however, the expansible end thereof is preferably somewhat expanded by the shoulder 32 on the spindle so as to make light contact with the internal surface of the guide as it passes downwardly therein. After the member 27 is thus firmly seated the spindle 10 is rotated by manipulation of the head 25 on the fixed screw 24, or otherwise, in such direction as to force the sleeve 29 upwardly and thus expand the same forcibly against the internal surface of the guide 11. This action is made possible by reason of the fact that the sleeve 29 is retained against rotation by the initial contact thereof with the guide. The member 27 and sleeve 29 thus provide a two point centering means for the spindle. In this position of the spindle the cutter 12 rests by gravity upon the unfinished valve seat conventionally shown at 35 and is accurately centered by reason of this concentric mounting on the spindle. The feed nut 26 is then advanced against the collar 21 to establish the required pressure between the cutter and work and while this pressure is maintained the cutter is rotated until the desired finish upon the work is obtained. Thereafter the tool may be readily released from the work merely by rotation of the spindle in such direction as to release the sleeve 29.

It will be noted that the cone member 27 is of such dimensions as to coact successfully with valve-stem guides of various diameters, and although the expansibility of the sleeve 29 will permit of some variation in guide sizes, the range of permissible variations may be extended by the use of sleeves of various sizes. It will also be noted that adjustability of the screw 24 upon the spindle 10 together with the adjustability of the feed nut 26 upon the screw affords a wide range of adjustment of the cutter 12 upon the spindle 10, so that the tool can be readily accommodated to various classes of work involving a wide variation in the distance between the valve seat and the top of the valve-stem guide.

A modified form of spindle centering element is shown in Figure 2, which in some instances may be advantageously substituted for the sleeve 29 of Figure 1. This element comprises a cone member 36 threaded upon the lower end 34' of the spindle 10' and having a tapered end 37 adapted to seat within the lower end of a valve-stem guide 11'. When such an element is used it is applied to the spindle 10' after the spindle has been projected through the guide. It serves to center the lower end of the spindle and coacts with the other cone member to securely anchor the spindle against end play.

Various changes may be made in the tool hereinabove specifically described without departing from or sacrificing the advantages of the invention as defined in the appended claims.

I claim:—

1. In a valve-seat finishing tool the combination of a spindle for insertion within a valve-stem guide, expansible means disposed concentrically of said spindle and adjustable lengthwise thereof, means for expanding said means against the internal surface of the guide to center the spindle therein, a tapered element disposed concentrically of said spindle for engagement within said guide and cooperating with said expansible means to effect accurate alignment of said spindle within the guide, and a rotary valve-seat finishing element centered by said spindle.

2. In a valve-seat finishing tool the combination of a spindle for insertion within a valve-stem guide, an expansible sleeve threaded on said spindle, means on said spindle operable to expand said sleeve by relative rotation between said spindle and sleeve, and a valve-seat finishing element rotatably mounted upon said spindle above said expansible sleeve.

3. In a valve-seat finishing tool the combination of a spindle for insertion within a valve-stem guide, an expansible sleeve threaded on said spindle, means on said spindle coacting with said sleeve to expand the same by relative rotation between said sleeve and spindle, a tapered element on said spindle cooperating with said sleeve to accurately align said spindle within the guide, and a valve-seat finishing tool rotatably mounted on said spindle.

4. In a valve-seat finishing tool the combination of a spindle, means for accurately centering and anchoring said spindle within a valve-stem guide, a sleeve mounted for rotation and lengthwise travel on said spindle, a cutter on said sleeve, means for rotating said cutter and sleeve, and a nut mounted for rotation in contact with said sleeve for feeding said cutter and sleeve along said spindle.

5. In a valve-seat finishing tool the combination of a spindle, means for accurately centering and anchoring said spindle within a valve-stem guide, a cutter mounted for rotation and lengthwise travel on said spindle, cutter rotating means, means for feeding said cutter along said spindle, said feeding means being adjustably mounted upon said spindle to accommodate the tool to a wide range of work.

6. In a valve seating tool, a post having a reduced portion at one end, part of said portion being tapered and the end threaded, a sleeve having a bore with a screw threaded section engaging the threaded portion of the post and a tapered section corresponding to the taper of the post, said sleeve being slotted from the tapered end toward the threaded end, a second sleeve fitted on the opposite end of said post, and a valve seat cutter attached to said sleeve and rotatable therewith on the post.

In witness whereof, I hereunto subscribe my name this 27th day of July, 1927.

EDWARD E. NELDNER.